(12) United States Patent
Lin

(10) Patent No.: US 7,135,828 B2
(45) Date of Patent: Nov. 14, 2006

(54) SYSTEM AND METHOD FOR CONTROLLING A PERMANENT MAGNET ELECTRIC MOTOR

(75) Inventor: Huai Lin, Kirkland (CA)

(73) Assignee: Turbocor, Inc., Dorval (CA)

( * ) Notice: Subject to any disclaimer, the term of this patent is extended or adjusted under 35 U.S.C. 154(b) by 0 days.

(21) Appl. No.: 10/510,030

(22) PCT Filed: Apr. 2, 2003

(86) PCT No.: PCT/CA03/00486
§ 371 (c)(1), (2), (4) Date: Oct. 1, 2004

(87) PCT Pub. No.: WO03/082013
PCT Pub. Date: Oct. 9, 2003

(65) Prior Publication Data
US 2005/0174089 A1    Aug. 11, 2005

(30) Foreign Application Priority Data
Apr. 2, 2002    (CA) .................................. 2379732

(51) Int. Cl.
*H02P 6/08* (2006.01)
(52) U.S. Cl. ......................... 318/254; 318/721
(58) Field of Classification Search ............... 318/138, 318/254, 439, 720–724
See application file for complete search history.

(56) References Cited

U.S. PATENT DOCUMENTS

| | | | |
|---|---|---|---|
| 5,144,564 A * | 9/1992 | Naidu et al. ................. | 318/721 |
| 5,294,876 A * | 3/1994 | Jonsson ....................... | 318/803 |
| 5,903,128 A   | 5/1999 | Sakakibara et al. | |
| 6,339,308 B1 * | 1/2002 | Shinnaka .................... | 318/701 |
| 6,518,722 B1 * | 2/2003 | Giuseppe ..................... | 318/727 |
| 6,552,509 B1 * | 4/2003 | Veltman ....................... | 318/807 |
| 6,577,096 B1   | 6/2003 | Cho | |
| 6,864,660 B1 * | 3/2005 | Veltman ....................... | 318/801 |
| 2002/0041171 A1 | 4/2002 | Cho | |

FOREIGN PATENT DOCUMENTS

DE    101 40 034    8/2000

(Continued)

OTHER PUBLICATIONS

Low KS et al:"Two-degree-of-freedom control of a PMSM drive without mechanical sensor", Iecon '98, Proceedings of the 24th Annual Conference of the IEEE Industrial Electronics Society. AACHEN, Aug. 31-Sep. 4, 1998. Annual Conference of the IEEE Industrial Electronics Society. New York, NY: IEEE US, vol. 1, Aug. 31, 1998, pp. 498-502, XP001003522. ISBN: 0-7803-4505-5 p. 498, column 1, paragraph 3; figures 1,2,5 p. 500-501.

*Primary Examiner*—Bentsu Ro
(74) *Attorney, Agent, or Firm*—Schnader Harrison Segal & Lewis, LLP; Joan T. Kluger

(57) ABSTRACT

A system and method are provided for controlling a three-phased permanent magnet electric motor terminal voltages in relation to both changes in speed and torque of the permanent magnet electric motor, whereby phase currents are first rotated from a stationary frame to two decoupled current components in a rotor synchronous frame, which enable to derive a voltage along a quadrature axis and a voltage along a direct axis thereof, before rotating back the quadrature and direct axis voltages from the rotor synchronous frame to the stationary frame to yield the permanent magnet electric motor terminal voltages.

10 Claims, 2 Drawing Sheets

FOREIGN PATENT DOCUMENTS

| | | |
|---|---|---|
| EP | 0 944 164 | 9/1999 |
| JP | 09 285198 | 10/1997 |
| JP | 2002125400 | 4/2002 |
| JP | 3645509 | 5/2005 |

* cited by examiner

SYSTEM AND METHOD FOR CONTROLLING A PERMANENT MAGNET ELECTRIC MOTOR

FIELD OF THE INVENTION

The present invention relates to permanent magnet electric motors. More precisely, the present invention is related to a system and a method for controlling a permanent magnet electric motor.

BACKGROUND OF THE INVENTION

Generally, in order to control a permanent magnet motor, characteristics of the permanent magnet motor such as the phase, the frequency and the amplitude of the electric motive force ("emf") voltage generated by the rotation of the motor rotor, need to be determined to yield a voltage to be applied to the motor terminals.

These characteristics of the permanent magnet motor may be obtained by using a position sensor, which results in increased costs and reduces the reliability of the method because feedback signals are subject to changes in the ambient environment such as noise and temperature and to the presence of impurity for example.

A possible method involves estimating the emf of the permanent magnet motor. However, in case of a high-speed motor this method requires a high computation speed, which may result costly. Moreover, since the characteristics of the motor are dependent on the ambient environment, such a control method can be complex.

European Patent EP0944164 teaches a system and a method for controlling a permanent magnet electric motor using an induced voltage estimator.

From the foregoing, it appears that although a number of methods are known to control permanent magnet motors, these methods either require position sensors and complicated computation or must be adapted to the environment according to each design of permanent magnet motors.

Therefore, there is a need for a system and a method, which allow controlling a permanent magnet electric motor in a simple, reliable way and which automatically adapts to environmental changes.

OBJECTS OF THE INVENTION

An object of the present invention is therefore to provide an improved controller system and method for a permanent magnet electric motor.

SUMMARY OF THE INVENTION

More specifically, in accordance with the present invention, there is provided a system for controlling a permanent magnet electric motor, comprising a motor controller and a power stage, the motor controller using phase currents of the permanent magnet electric motor to generate voltage controlling signals in relation to both changes in speed and torque of the permanent magnet electric motor, which are fed back to the permanent magnet electric motor via the power stage.

Moreover, there is provided a method for controlling a permanent magnet electric motor comprising determining a current of each phase of the permanent magnet electric motor, obtaining voltage controlling signals in relation to both changes in speed and torque of the permanent magnet electric motor; and feeding the voltage controlling signal back to the permanent magnet electric motor.

There is further provided a circuit for controlling a permanent magnet three-phases electric motor provided with a rotor and a stator, comprising a rotator allowing rotation of current signals of the phases of the permanent magnet electric motor from a stationary frame to two decoupled current components in a rotor synchronous frame along a direct axis ($I_d$) and a quadrature axis ($I_q$) respectively; a proportional and integral operator for deriving a voltage ($V_q$) along the quadrature axis and a voltage ($V_d$) along the direct axis; a rotator allowing rotating the voltages $V_q$ and $V_d$ back from the rotor synchronous frame to the stationary frame to yield terminal voltages $V_a$, $V_b$ and $V_c$ of the permanent magnet electric motor.

There is still further provided a method for controlling a permanent magnet three-phases electric motor provided with a rotor and a stator, comprising rotating current signals of the phases of the permanent magnet electric motor from a stationary frame to two decoupled current components in a rotor synchronous frame along a direct axis ($Id$) and a quadrature axis ($I_q$) respectively; deriving a voltage ($V_q$) along the quadrature axis therefrom; deriving a voltage ($V_d$) along the direct axis; rotating the voltages $V_q$ and $V_d$ back from the rotor synchronous frame to the stationary frame to yield terminal voltages $V_a$, $V_b$ and $V_c$ of the permanent magnet electric motor.

There is also provided a method for controlling a permanent magnet electric motor having three-phases each supporting a current $i_a$, $i_b$ and $i_c$ respectively, comprising determining the currents $i_a$, $i_b$ and $i_c$; rotating the currents $i_a$, $i_b$ and $i_c$ by an angle $-\theta_n$ to yield currents $I_d$ and $I_q$; computing a current torque of the permanent magnet electric motor; computing a current rotating angle $\theta_{n+1}$; computing a voltage output $V_q$; computing a voltage output $V_d$; rotating the voltages Vq and $V_d$ by the rotating angle θn+1 to yield three voltage controlling signals $V_a$, $V_b$ and $V_c$; and applying the voltage controlling signals $V_a$, $V_b$ and $V_c$ to the permanent magnet electric motor.

Other objects, advantages and features of the present invention will become more apparent upon reading of the following non restrictive description of embodiments thereof, given by way of example only with reference to the accompanying drawings.

Figure 1:
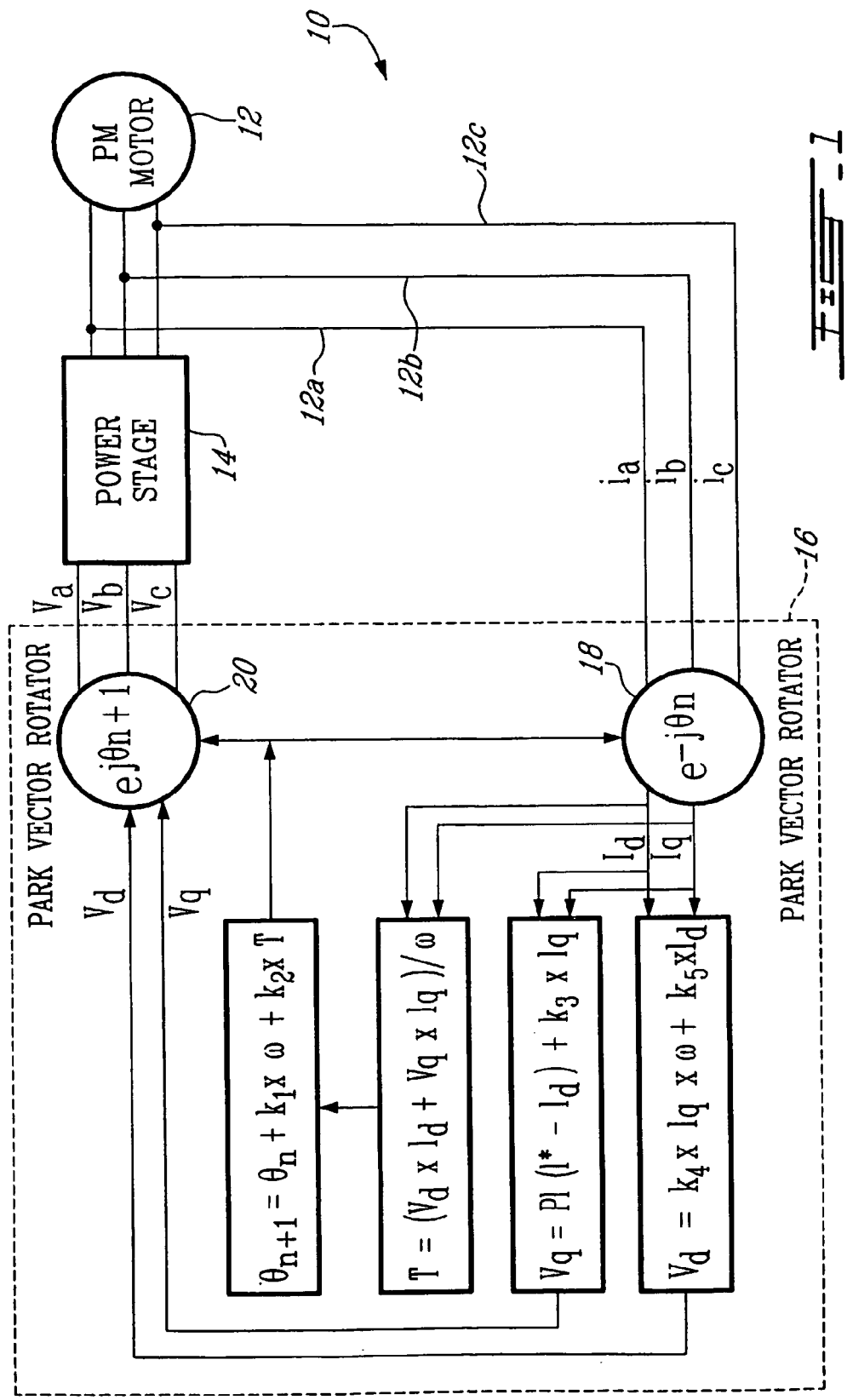
FIG. 1 is a simplified diagram of a motor controller system according to an embodiment of a first aspect of the present invention.

DESCRIPTION OF THE EMBODIMENT and method for controlling a three-phased electric motor, by monitoring the terminal voltages thereof in relation to both changes in speed and torque of the motor.

More specifically, the present invention provides that the phase currents of a permanent magnet electric motor are first rotated from a stationary frame into two decoupled current components in a rotor synchronous frame, which enable to derive a voltage along a quadrature axis and a voltage along a direct axis thereof, before rotting back the quadrature and direct axis voltages from the rotor synchronous frame to the stationary frame to yield the motor terminal voltages.

The system 10 shown in FIG. 1 comprises a permanent magnet motor, referred to hereinafter as PM motor 12; a power stage 14; and a motor controller 16.

The PM motor 12 is a three-phase electric motor provided with a rotor and a stator (not shown), each one of the phases carrying a current, $i_a$, $i_b$ and $i_c$, respectively. These phases currents are sensed and used by the park vector rotator unit 16 to generate three voltage-controlling signals $V_a$, $V_b$ and $V_c$, which are then supplied to the power stage 14.

For example, the power stage 14 may be of the type provided by Semikron, in particular the SKiiPACK™ 342 GD 120-314 CTV for example.

The angular speed "ω" of the motor is controlled by a user by setting a value representing the speed of the PM motor 12 into the system 10. The user chooses a reference current value "I*", normally set at 0, but other values may be selected.

The motor controller 16 is in the form of a park veer rotator unit. The park vector rotator unit 16 generates two continuously rotating angles having instantaneous values $\theta_{n+1}$ and $-\theta_n$, wherein the negative sign represents an opposite direction of rotation, the subscript "n+1" labels a current computing angle, and the subscript "n" labels the previous computing angle.

Figure 2:
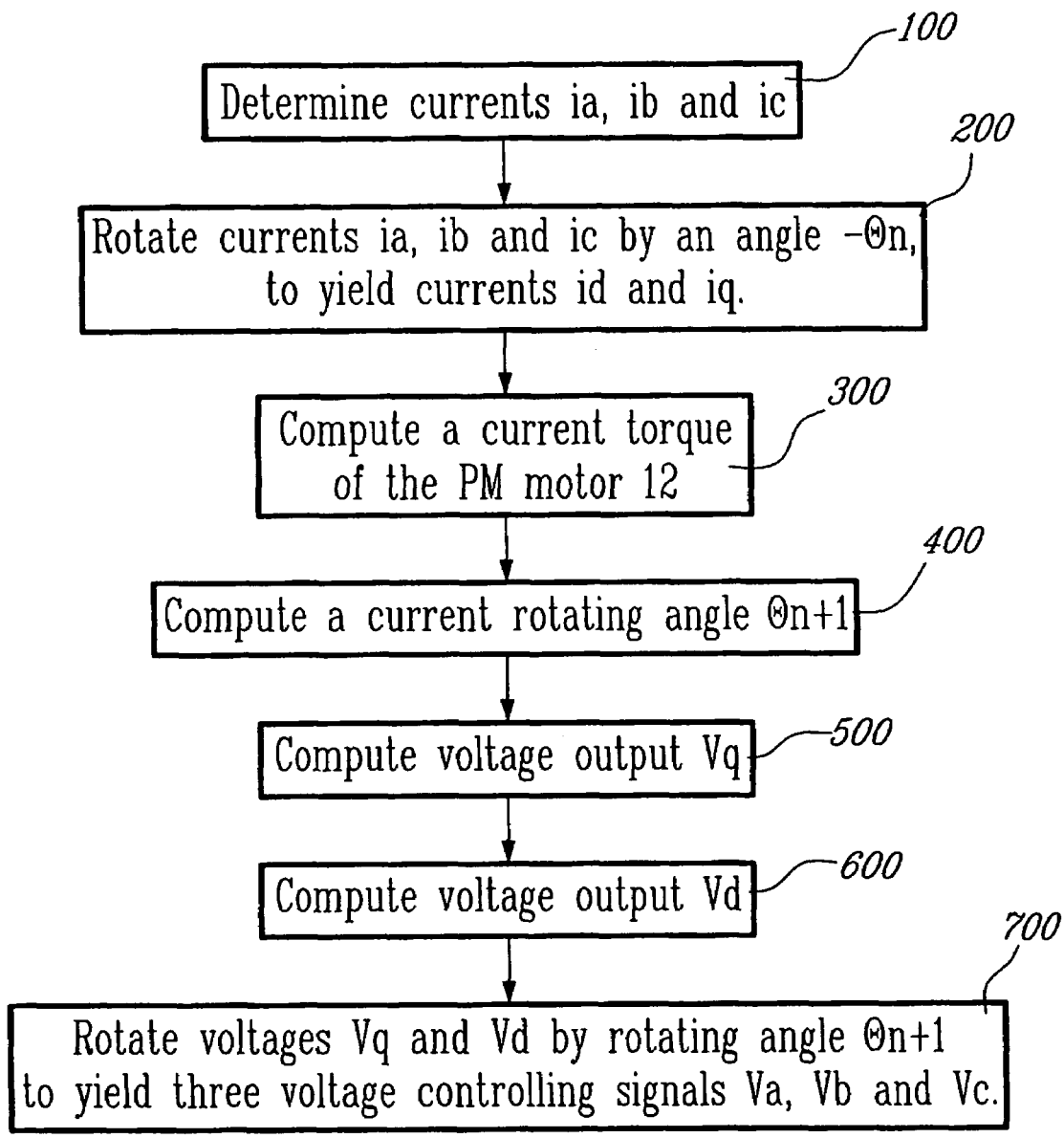
FIG. 2 is a flowchart of a method for controlling an electric motor according to an embodiment of a second aspect of the present invention.

For clarity purposes, the main steps of a method for controlling a permanent magnet electric motor using the system 10 according to a second aspect of the invention will now be described in reference to FIG. 2.

In a first step 100, the three currents $i_a$, $i_b$ and $i_c$, from the three phases of the PM motor 12 are determined by the use of standard current sensors.

Then, in a following step (200), the three currents $i_a$, $i_b$ and $i_c$ are processed in an inverse park vector rotator 18, which rotates them by an angle $-\theta_n$, to output two currents $I_d$ and $I_q$.

In step 300, the two currents $I_d$ and $I_q$ are used to compute a current torque "T" of the PM motor 12, which is in turn used to compute the current rotating angle $\theta_{n+1}$ (step 400).

Additionally, the two currents $I_d$ and $I_q$ are used to compute two voltage outputs $V_q$ and $V_d$ (steps 500 and 600). The voltage outputs $V_q$ and $V_d$ are then rotated in a park vector rotator 20 by the rotating angle $\theta_{n+1}$ to yield three voltage controlling signals $V_a$, $V_b$ and $V_c$ (step 700).

Returning now to FIG. 1 the steps of the method of the present invention will now be described in more details.

The current computing angle is derived in response to changes of the speed ω and of the torque T of the PM motor 12 from the following equation:

$$\theta_{n+1} = \theta_n + k_1 \times \omega + k_2 \times T \quad (1)$$

where $k_1$ and $k_2$ are constants.

As seen in FIG. 1, the phase currents $i_a$, $i_b$ and $i_c$ are directed through lines 12a, 12b and 12c to a first inverse park vector rotator 18, which rotates them by the angle $-\theta_n$, to output the two currents $I_d$ and $I_q$, according to the following relations on the d-q axis fixed on the rotor axis:

$$I_d = \tfrac{2}{3} \times [i_a \times \cos(\theta_n) + i_b \times \cos(\theta_n + 120°) + i_c \times \cos(\theta_n - 120°)] \quad (2)$$

$$I_q = \tfrac{2}{3} \times [i_a \times \sin(\theta_n) + i_b \times \sin(\theta_n + 120°) + i_c \times \sin(\theta_n - 120°)] \quad (3)$$

It is to be noted that either the three currents $i_a$, $i_b$ and $i_c$ from the three phases of the PM motor 12 are measured, or only two of them, the third phase current being calculated from the other two phases since, as is known in the art, the following relation holds:

$$\sum_{three\ phases} i = 0 \quad (4)$$

The $I_d$ and $I_q$ rotated values are further used to generate a first voltage output $V_q$ which takes into account an error between the preset value I* and $I_d$, according to the following equation on the d-q axis fixed on the rotor axis:

$$V_q = PI(I^* - I_d) + k_3 \times I_q \quad (5)$$

where $k_3$ is a constant, "PI" refers to a proportional and integral operator, defined as follows:

$$PI(x) = ax + b\int x\, dt \quad (6)$$

where a and b are constants and the integration is over time.

The $I_d$ and $I_q$ rotated values are also used to generate the second voltage output $V_d$, according to the following equation on the d-q axis fixed on the rotor axis:

$$V_d = k_5 \times I_d + k_4 \times I_q \times \omega \quad (7)$$

where $k_4$ and $k_5$ are constants

Moreover, the speed ω is set by the user as stated hereinabove, whereas the torque T can be calculated by the following formula:

$$T = (V_d \times I_d + V_q \times I_q)/\omega \quad (8)$$

using the $I_d$ and $I_q$ currents and $V_d$ and $V_q$ on the d-q axis fixed on the rotor frame, as determined hereinabove by equations (2)–(3).

The two voltages $V_d$ and $V_q$ in the continuously rotating reference frame are then submitted to a second park vector rotator 20, whereby they are rotated by the angle $\theta_{n+1}$, to produce three voltage controlling signals, namely $V_a$, $V_b$ and $V_c$, which control the power unit 14, according to the following equations:

$$V_a = V_d \times \cos(\theta_{n+1}) + V_q \times \sin(\theta_{n+1}) \quad (9)$$

$$V_b = V_d \times \cos(\theta_{n+1} + 120°) + V_q \times \sin(\theta_{n+1} + 120°) \quad (10)$$

$$V_c = V_d \times \cos(\theta_{n+1} - 120°) + V_q \times \sin(\theta_{n+1} - 120°) \quad (11)$$

It is to be noted that the values $k_1$ to $k_5$ are constants that the user sets, when designing the system 10, based on a number of parameters, including the sampling rate of the computer to be used, condition of the power drive, sensitivity of the current sensors, the characteristics of the motor etc. . . .

From the foregoing, it should be apparent that the present invention provides for a system and a method whereby the motor terminal voltages are self-adapting. More specifically, three current signals are first rotated from a stationary frame to two decoupled current components in a rotor synchronous frame, along a direct axis ($I_d$) and a quadrature axis ($I_q$) respectively. Then, on the first hand, a voltage ($V_q$) along the quadrature axis is derived therefrom, by applying a proportional and integral operator on the direct axis current component added with a product of a constant and the current components along the quadrature axis (see equation 5). On the other hand, a voltage ($V_d$) along the direct axis is derived, as a product of the direct axis current component added to a product of the speed of the motor by the quadrature current component (see equation 7). Finally, the quadrature and direct axis voltages ($V_q$ and $V_d$) thus computed are rotated back from the rotor synchronous frame to the stationary frame to yield the motor terminal voltages ($V_a$, $V_b$ and $V_c$ see equations 9–11).

Therefore, the present system and method allow for a continuously updating value of the angle in response to changes of speed and variations in the torque as well as to changes in ambient conditions.

From the foregoing, it is now also apparent that the present invention provides a circuit for controlling a permanent magnet three-phases electric motor provided with a rotor and a stator, comprising a rotator allowing rotation of current signals of the phases of the permanent magnet electric motor from a stationary frame to two decoupled current components in a rotor synchronous frame along a direct axis ($I_d$) and a quadrature axis ($I_q$) respectively; a proportional and integral operator for deriving a voltage ($V_q$) along the quadrature axis and a voltage ($V_d$) along the direct axis; a rotator allowing rotating the voltages $V_q$ and $V_d$ back from the rotor synchronous frame to the stationary frame to yield terminal voltages $V_a$, $V_b$ and $V_c$ of the permanent magnet electric motor.

In particular, people in the art will appreciate that the method and system of the present invention allows controlling a permanent magnet motor without resorting to position sensors or characteristics of the permanent magnet motor such as the emf, which are liable to depend on the environment, thereby adaptable to environmental conditions.

Although the present invention has been described hereinabove by way of specific embodiments thereof, it can be modified, without departing from the spirit and nature of the subject invention as defined in the appended claims.

What is claimed is:

1. A system for controlling a permanent magnet electric motor (12), comprising:
   a motor controller (16), said motor controller (16) using phase currents of the permanent magnet electric motor (12) at a preset speed ω to generate voltage-controlling signals used to obtain changes in torque T of the permanent magnet electric motor (12); and
   a power stage (14), said power stage (14) receiving the voltage-controlling signals from the motor controller (16) and feeding them back to the permanent magnet electric motor (12), wherein said motor controller (16) is a park vector rotator unit that generates continuously rotating angles.

2. The system for controlling a permanent magnet electric motor according to claim 1, said system continuously responding to changes of the preset speed and torque of the permanent magnet electric motor (12) as well as to changes in ambient conditions.

3. A method for controlling a permanent magnet electric motor (12) comprising:
   determining a current of each phase of the permanent magnet electric motor (12) at a preset speed ω;
   obtaining voltage controlling signals at the preset speed ω in relation to changes in torque of the permanent magnet electric motor (12); and
   feeding the voltage controlling signal back to the permanent magnet electric motor (12); computing a current torque T of the permanent magnet electric motor (12);
   wherein said computing a current torque T comprises rotating the currents of each phase of the permanent magnet electric motor by an angle $-\theta_n$ to output two currents $I_d$ and $I_q$, according to the following relations on a d-q axis fixed on a rotor axis of the permanent magnet electric motor (12):

$$I_d = \tfrac{2}{3} \times [i_a \times \cos(\theta_n) + i_b \times \cos(\theta_n + 120°) + i_c \times \cos(\theta_n - 120°)]$$

and $$I_q = \tfrac{2}{3} \times [i_a \times \sin(\theta_n) + i_b \times \sin(\theta_n + 120°) + i_c \times \sin(\theta_n - 120°)]$$

4. A method for controlling a permanent magnet electric motor (12) comprising:
   determining a current of each phase of the permanent magnet electric motor (12) at a preset speed ω;
   obtaining voltage controlling signals at the preset speed ω in relation to changes in torque of the permanent magnet electric motor (12); and
   feeding the voltage controlling signal back to the permanent magnet electric motor (12), wherein said determining a current of each phase of the permanent magnet electric motor (12) comprising measuring a current of two phases thereof and calculating a current of a third phase using the relation:

$$\sum_{three\ phases} i = 0. \qquad (4)$$

wherein said obtaining voltage controlling signals comprises:
   computing a current rotating angle $\theta_{n+1}$;
   computing two voltage outputs $V_q$ and $V_d$; and
   rotating the voltage outputs $V_q$ and $V_d$ by the angle $\theta_{n+1}$.

5. The method for controlling a permanent magnet electric motor according to claim 4, wherein said computing a current rotating angle $\theta_{n+1}$ is done using a current torque T and a preset speed ω of the permanent magnet electric motor (12) with the formula $\theta_{n+1} = \theta_n + k_1 \times \omega + k_2 \times T$ where $k_1$ and $k_2$ are constants.

6. The method for controlling a permanent magnet electric motor according to claim 5, wherein said computing two voltage outputs $V_q$ and $V_d$ comprises:
   computing the voltage output $V_q$ on a d-q axis fixed on a rotor axis: $V_q = PI(I^* - I_d) + k_3 \times I_q$ where $k_3$ is a constant, "PI" referring to a proportional and integral operator, defined as follows: $PI(x) = ax + b \int x\, dt$ where a and b are constants and integration is over time; and
   computing the voltage output $V_d$, according to the following equation on the d-q axis fixed on the rotor axis: $V_d = k_5 \times I_d + k_4 \times I_q \times \omega$ where $k_4$ and $k_5$ are constants.

7. The method for controlling a permanent magnet electric motor according to claim 5, wherein said obtaining voltage controlling signals comprises obtaining three voltage controlling signals $V_a$, $V_b$ and $V_c$ according to the following equations:

$$V_a = V_d \times \cos(\theta_{n+1}) + V_q \times \sin(\theta_{n+1}),\ V_b = V_d \times \cos(\theta_{n+1} + 120°) + V_q \times \sin(\theta_{n+1} 120°) \text{ and } V_c = V_d \times \cos(\theta_{n+1} - 120°) + V_q \times \sin(\theta_{n+1} - 120°).$$

8. A circuit for controlling a permanent magnet three-phases electric motor provided with a rotor and a stator, comprising:
   a rotator allowing rotation of current signals of the phases of the permanent magnet electric motor (12) from a stationary frame to two decoupled current components in a rotor synchronous frame along a direct axis ($I_d$) and a quadrature axis ($I_q$) respectively;
   a proportional and integral operator for deriving a voltage ($V_q$) along the quadrature axis and a voltage ($V_d$) along the direct axis;
   a rotator allowing rotating the voltages $V_q$ and $V_d$ back from the rotor synchronous frame to the stationary frame to yield terminal voltages $V_a$, $V_b$ and $V_c$ of the permanent magnet electric motor;

wherein a current rotating angle $\theta_{n+1}$ is computed using a current torque T and a preset speed $\omega$ of the permanent magnet electric motor with a formula as follows: $\theta_{n+1} = \theta_n + k_1 \times \omega + k_2 \times T$ where $k_1$ and $k_2$ are constants.

9. A method for controlling a permanent magnet three-phases electric motor provided with a rotor and a stator, comprising:

rotating current signals of the phases of the permanent magnet electric motor (12) from a stationary frame to two decoupled current components in a rotor synchronous frame along a direct axis ($I_d$) and a quadrature axis ($I_q$) respectively;

deriving a voltage ($V_q$) along the quadrature axis therefrom;

deriving a voltage ($V_d$) along the direct axis;

rotating the voltages $V_q$ and $V_d$ back from the rotor synchronous frame to the stationary frame to yield terminal voltages $V_a$, $V_b$ and $V_c$ of the permanent magnet electric motor;

wherein a current rotating angle $\theta_{n+1}$ is computed using a current torque T and a preset speed $\omega$ of the permanent magnet electric motor (12) with a formula as follows: $\theta_{n+1} = \theta_n + k_1 \times \omega + k_2 \times T$ where $k_1$ and $k_2$ are constants.

10. A method for controlling a permanent magnet electric motor having three-phases each supporting a current $i_a$, $i_b$ and $i_c$ respectively, comprising:

determining the currents $i_a$, $i_b$ and $i_c$;

rotating the currents $i_a$, $i_b$ and $i_c$ by an angle $-\theta_n$ to yield currents $I_d$ and $I_q$;

computing a current torque of the permanent magnet electric motor (12);

computing a current rotating angle $\theta_{n+1}$;

computing a voltage output $V_q$;

computing a voltage output $V_d$;

rotating the voltages $V_q$ and $V_d$ by the rotating angle $\theta n+1$ to yield three voltage controlling signals $V_a$, $V_b$ and $V_c$; and applying the voltage controlling signals $V_a$, $V_b$ and $V_c$ to the permanent magnet electric motor;

wherein a current rotating angle $\theta_{n+1}$ is computed using the current torque T and a preset speed $\omega$ of the permanent magnet electric motor (12) with a formula as follows: $\theta_{n+1} = \theta_n + k_1 \times \omega + k_2 \times T$ where $k_1$ and $k_2$ are constants.

* * * * *